US011403421B2

(12) United States Patent
Gulsen et al.

(10) Patent No.: US 11,403,421 B2
(45) Date of Patent: *Aug. 2, 2022

(54) SECURITY SYSTEM FOR BENCHMARK ACCESS

(71) Applicant: Workday, Inc., Pleasanton, CA (US)

(72) Inventors: Denis Gulsen, Redwood City, CA (US); Erol Guney, San Ramon, CA (US); Amir Ali Afghani, San Ramon, CA (US); Eric James Ranstrom, San Francisco, CA (US); Thomas Monir Ghali, San Ramon, CA (US); Kayla Marie Kimura, Oakland, CA (US)

(73) Assignee: Workday, Inc., Pleasanton, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/943,215

(22) Filed: Jul. 30, 2020

(65) Prior Publication Data
US 2020/0356696 A1    Nov. 12, 2020

Related U.S. Application Data

(63) Continuation of application No. 15/693,782, filed on Sep. 1, 2017, now Pat. No. 10,769,298.

(51) Int. Cl.
*G06F 21/62*    (2013.01)
*H04L 9/40*     (2022.01)
*H04L 67/1097*  (2022.01)

(52) U.S. Cl.
CPC ........ *G06F 21/6245* (2013.01); *H04L 63/105* (2013.01); *H04L 67/1097* (2013.01)

(58) Field of Classification Search
CPC .......... G06F 21/6245; H04L 63/105; H04L 67/1097
See application file for complete search history.

(56) References Cited

U.S. PATENT DOCUMENTS

| 8,578,501 B1 | 11/2013 | Ogilvie |
| 8,646,030 B2 | 2/2014 | Hu |
| 9,202,026 B1 | 12/2015 | Reeves |
| 9,377,991 B1 * | 6/2016 | Rapport ................ G06F 16/444 |
| 10,181,043 B1 | 1/2019 | Pauley, Jr. |
| 2009/0150362 A1 | 6/2009 | Evenhaim |

(Continued)

*Primary Examiner* — Olugbenga O Idowu
(74) *Attorney, Agent, or Firm* — Van Pelt, Yi & James LLP (57) ABSTRACT

A system for analytics security includes processor(s) and a readable medium. The readable medium causes the system to perform operations comprising receiving a request for analytics data; determining the analytics data based on the request (the analytics data comprises result(s) of an analytic calculation performed on commingled data and the commingled data comprises tenant data shared by a tenant and other tenant data shared by other tenant(s)); determining security information associated with the analytics data (the security information associated with the analytics data is based on the commingled data used for determining the analytics data); determining permissions associated with the requestor based on the tenant; determining whether the requestor is credentialed based on the security information associated with the analytics data and the permissions associated with the requestor; and providing the analytics data to the requestor based on a determination that the requestor is credentialed.

18 Claims, 10 Drawing Sheets

(56) References Cited

U.S. PATENT DOCUMENTS

| | | |
|---|---|---|
| 2009/0254511 A1 | 10/2009 | Yeap |
| 2009/0300716 A1 | 12/2009 | Ahn |
| 2011/0022681 A1 | 1/2011 | Simeonov |
| 2013/0111545 A1 | 5/2013 | Sharma |
| 2014/0282949 A1 | 9/2014 | Nath |
| 2014/0373182 A1 | 12/2014 | Peri |
| 2017/0195307 A1* | 7/2017 | Jones-McFadden ........................ H04W 12/06 |
| 2017/0270318 A1 | 9/2017 | Ritchie |
| 2017/0332409 A1 | 11/2017 | Yerramalli |
| 2018/0032748 A1 | 2/2018 | Rueger |
| 2018/0262514 A1 | 9/2018 | Hall |
| 2018/0285596 A1 | 10/2018 | Jones |
| 2019/0058991 A1 | 2/2019 | Al-Kabra |

* cited by examiner

SECURITY SYSTEM FOR BENCHMARK ACCESS

CROSS REFERENCE TO OTHER APPLICATIONS

This application is a continuation of U.S. patent application Ser. No. 15/693,782, entitled SECURITY SYSTEM FOR BENCHMARK ACCESS filed Sep. 1, 2017 which is incorporated herein by reference for all purposes.

BACKGROUND OF THE INVENTION

A system for a multitenanted database stores data for a plurality of tenants (e.g., organizations utilizing database services). Each tenant comprises a plurality of users (e.g., company employees). The multitenanted database stores user data for each user of each tenant (e.g., name, identification number, title, salary, etc.). Tenant data is stored on a set of data partitions securely separated by tenant (e.g., on different computers, on different hard drives, on different virtual machines, etc.) in order to prevent users from accessing data belonging to other tenants. The system for a multitenanted database, comprising the large set of tenant data, has the capability to produce data analyses that would be valuable to each tenant (e.g., typical group size within organizations of different sizes, average salaries for different employee roles, etc.). Some tenant data includes data security (e.g., permissions indicating a set of tenant users allowed access to the tenant data). Data including data security is included in multitenant data analyses, creating a problem wherein the data security needs to be applied to users in the multitenant data analysis system that are associated with tenants not under the original security scheme.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for analytics security comprises an input interface configured to receive a request for analytics data, wherein the request is associated with a requestor, and a processor configured to determine security associated with the analytics data, wherein security associated with the analytics data is based at least in part on commingled data used for determining the analytics data, determine permissions associated with the requestor, determining whether the requestor is credentialed based at least in part on the security associated with the analytics data and the permissions associated with the requestor, and in the event it is determined that the requestor is credentialed, provide the analytics data to the requestor. In some embodiments, the system additionally comprises a memory coupled to the processor and configured to provide the processor with instructions.

A system for analytics security comprises a system for providing analytics data including data security in a tenanted data storage system. The system comprises a set of tenant data storage units and a commingling storage unit. Tenant data for a tenant is stored for typical system use on a tenant data storage unit. A tenant has access to its tenant data stored on its associated tenant data storage unit but not to tenant data stored on other tenant data storage units that is associated with other tenants. In order to facilitate comparisons across tenant data and perform analytics on that tenant data, data is stored on the commingling storage unit. In the event that a given tenant opts in to sharing its secure data in the commingling system, data is transferred from a tenant data storage unit to the commingling storage unit. The analytics that the system performs on the commingled data include comparisons that benefit from data points outside of an individual tenant (e.g., running benchmark calculations on typical employee salaries, retention times, etc.). Opting into sharing data enables a tenant that is contributing data to the commingled data storage to access analytics determined from the commingled data.

Data stored on the tenant data storage unit is associated with data security. Data security comprises an indication of a set of users associated with the tenant that are allowed to access the data. For example, users are assigned a security level of an ordered hierarchy of security levels (e.g., employee level 1, employee level 2, employee level 3, manager level 1, manager level 2, manager level 3, administrator level 1, administrator level 2, administrator level 3, etc.). Data security comprises an indication of a level that a user must be at or above to access the data. When tenant data is transferred from the tenant data storage unit to the commingling storage unit, data security remains associated with the data. Analytic data is determined using the commingled data and data security associated with the analytic data. The data security associated with the analytic data is based on the data security associated with the data contributing to the computation of the analytic data. For example, the data security associated with analytic data comprises the maximum security level associated with any data contributing to the computation of the analytic data. The security policy associated with the analytic data is the same as the tenant data—for example, the data security associated with analytic data comprises an indication of a level that a user must be at or above to access the data. Thus determining the data security associated with analytic data is the equivalent to the maximum security level associated with any data contributing to the computation of the analytic data. Thus, a user can only access analytic data in the event that all data contributing to the analytic data would be available to the user according to their security permissions (e.g., the equivalent security permissions for access to the data if it were within the user's tenant data storage unit).

In some embodiments, tenant data additionally comprises an analytics security escalation setting. The analytics security escalation setting indicates a security level escalation (e.g., a number of levels that the security level is to be raised—for example, to an adjusted security level equal to the security level plus the escalation) when data is commingled for computation of analytics. The data security associated with analytic data is then the maximum of the adjusted security level associated with all of the data that contributes to the analytic data. A tenant may choose to increase its security using an analytics security escalation in order to raise the security level required for users of other tenants to view analytics including its data. Conversely, a tenant may choose to reduce its security using a negative analytics security escalation, which would lower the security level required for users of other tenants to view analytics including its data. The tenant may decide to reduce the security requirement for the comingled data because the comingled data is only viewed as part of a set of data that has been processed to generate analytics on the data (e.g., benchmarks) and is not viewed directly, thus as it is obscured may require less security.

In some embodiments, when a tenant user requests analytic data, analytic data is determined based on data determined to be available by a tenant user. Rather than determining analytic data including security information and then determining whether a user can access the data based on the security information, analytic data is determined based only on data accessible to the user, such that it is guaranteed that the user will be able to access the analytic data.

Figure 1:
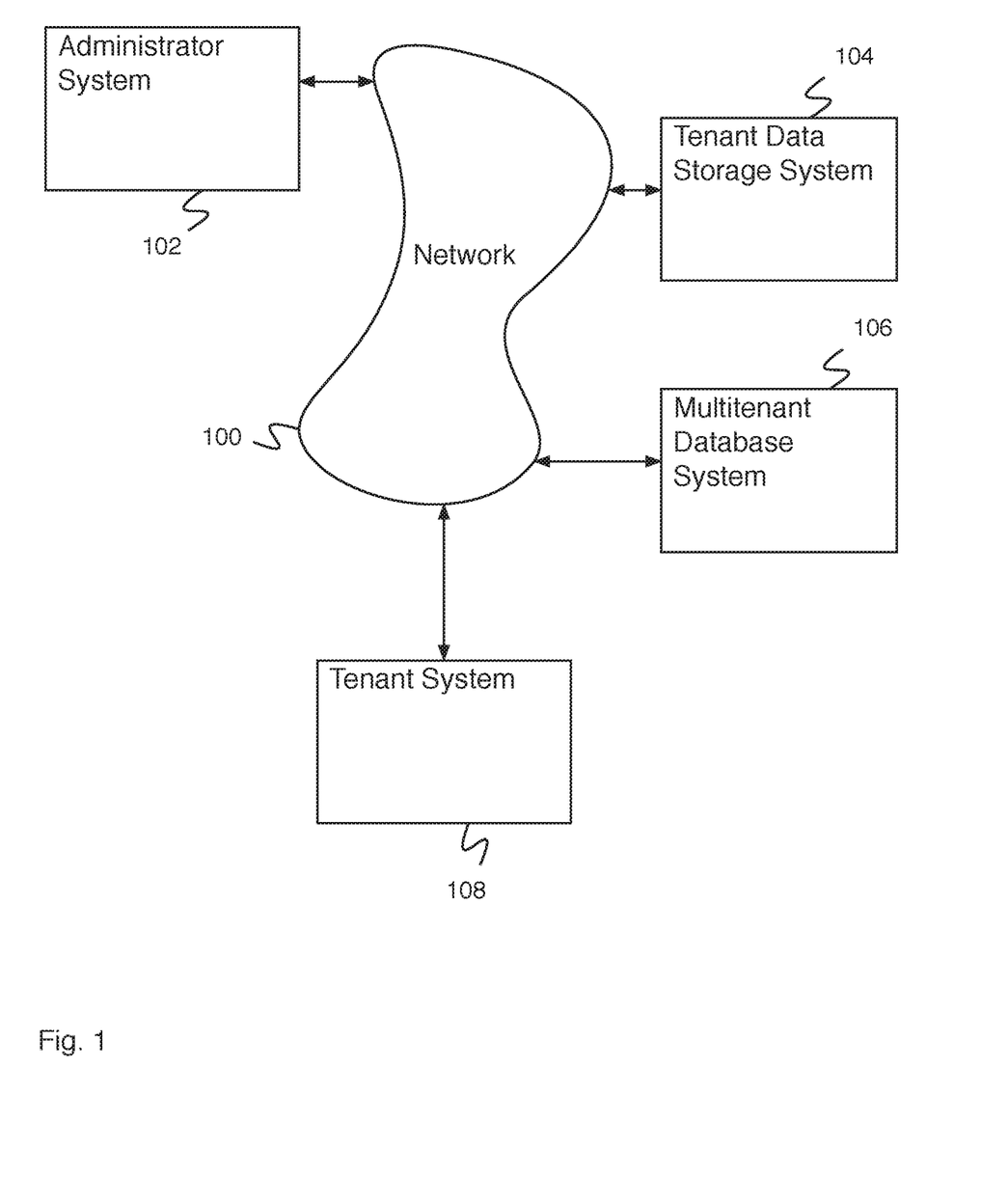
FIG. 1 is a block diagram illustrating an embodiment of a network system.

FIG. 1 is a block diagram illustrating an embodiment of a network system. In some embodiments, the network system of FIG. 1 comprises a system for a security system for benchmark access. In the example shown, a user using tenant system 108 requests an analytic calculation by multitenant database system 106 using comingled data stored using tenant data storage system 104. Multitenant database system 106 issues a request for data to tenant data storage system 104 and the request for data is received by an input interface. A processor of tenant data storage system 104 determines the security associated with the data requested for the analytics calculation. Accessing this data is based at least in part on the security associated with the commingled data used for determining the analytics calculation and the permissions associated with the requesting user of the analytics calculation. The processor is configured to determine whether the requestor is credentialed based at least in part on the security and the permissions, and in the event it is determined that the requestor is credentialed, provide the analytics data to the requestor. Data accessible by the user is then provided for the analytic calculation that is either performed by the processor associated with tenant data storage system 104 or by the processor associated with multitenant database system 106. The analytic data that are the results of the analytics calculation are provided to the user requesting the analytics calculation.

FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, tenant data storage system 104, multitenant database system 106, and tenant system 108 communicate via network 100. Administrator system 102 comprises an administrator system for use by an administrator. Administrator system 102 comprises an administrator system for executing administrator commands, for configuring tenant data storage system 104 or multitenant database system 106, for querying tenant data storage system 104 or multitenant database system 106, etc. Tenant data storage system 104 comprises a storage system for storing tenant data (e.g., customer organization data). Tenant data storage system 104 comprises a plurality of tenant data storage units for storing tenant data isolated by tenant, and a commingling storage unit for storing commingled tenant data. Multitenant database system 106 comprises a database system for providing tenant user access to data stored on tenant data storage system 104 (e.g., access to add data, view data, modify data, delete data, access reports, execute business processes, etc.). Tenant system 108 comprises a tenant system for use by a tenant user. A tenant user uses tenant system 108 to interact with multitenant database system 106, for example to store database data, to request database data, to request reporting based on database data, etc. In some embodiments, the network system of FIG. 1 comprises a plurality of tenant systems associated with one or more tenants.

Figure 2A:
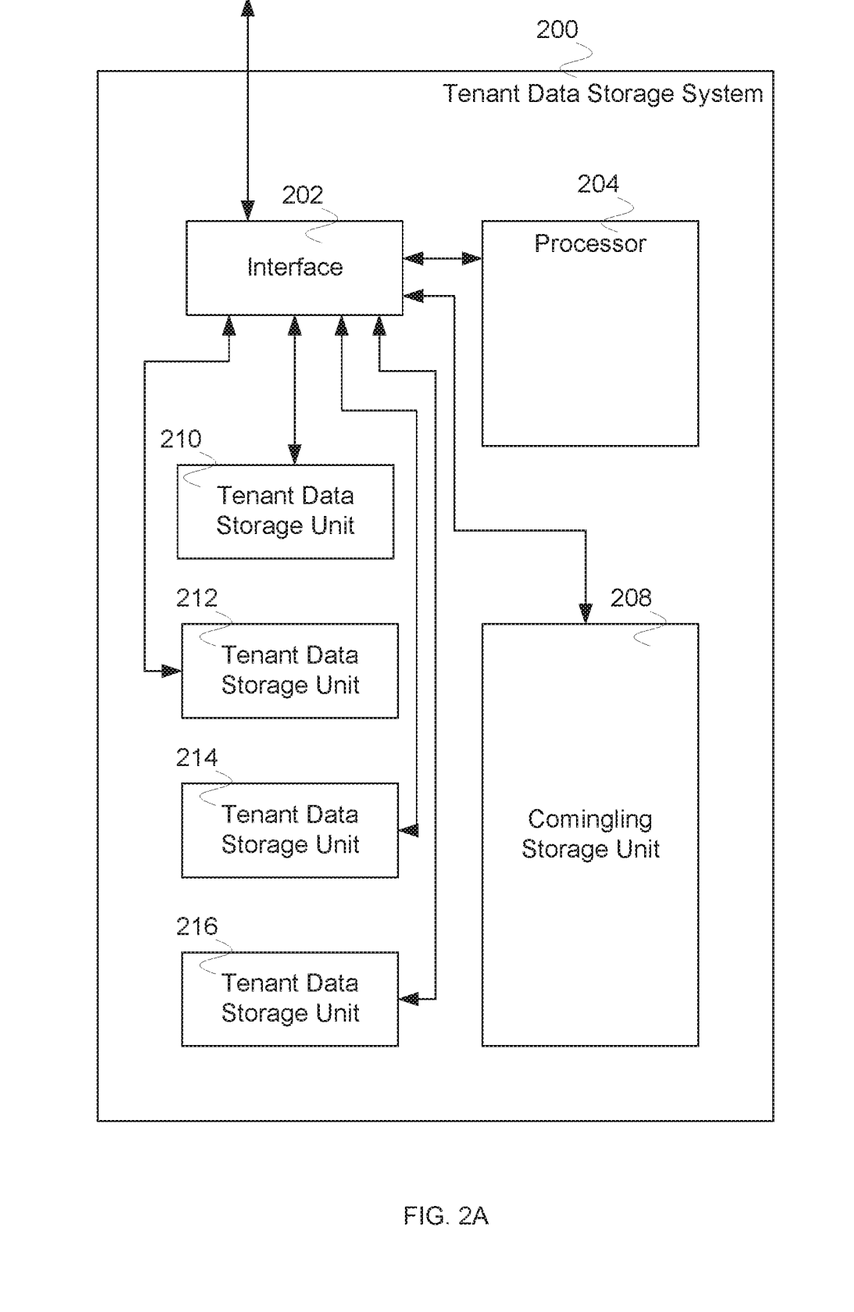
FIG. 2A is a block diagram illustrating an embodiment of a tenant data storage system.

FIG. 2A is a block diagram illustrating an embodiment of a tenant data storage system. In some embodiments, tenant data storage system 200 comprises tenant data storage system 104 of FIG. 1. In the example shown, interface 202 of tenant data storage system 200 receives a request to provide data associated with an analytic calculation (e.g., a benchmark calculation). Processor 204 determines data associated with the analytic calculation necessary for the analytic calculation in comingling storage unit 208. Comingling storage unit 208 receives data from tenant data storage units (e.g., tenant data storage unit 210, tenant data storage unit 212, tenant data storage unit 214, and tenant data storage 216). Comingling storage unit 208 also receives associated security information from the source tenant data storage units. Processor 204 is able to provide data to a multitenant database system or to perform the analytic calculation (having received the calculation desired along with the data request) using the data and provide the multitenant database system with the results of the calculation. The security access is checked for the requested calculation using the security information associated with the data and the security permissions associated with the requesting user. A subset of data is determined with allowed security access. That subset of data is provided for the analytic calculation.

Tenant data storage system 200 comprises tenant data storage unit 210, tenant data storage unit 212, tenant data storage unit 214, and tenant data storage unit 216. Each tenant data storage unit is associated with a different tenant. Tenant data storage system 200 comprises any appropriate number of tenant data storage units. Tenant data storage system 200 additionally comprises commingling storage unit 208 for commingling a portion of tenant data. Interface 202 comprises an interface for receiving tenant data (e.g., from tenant data storage unit 210, tenant data storage unit 212, tenant data storage unit 214, and tenant data storage unit 216) and for providing tenant data to be commingled in commingling storage unit 208. Interface 202 additionally comprises an interface for receiving a request for analytics data, wherein the request is associated with a requestor.

In various embodiments, the data a tenant opted into sharing is transferred to comingling storage unit 208 from a tenant data storage unit upon request (e.g., a tenant request, an administrator request, etc.) or automatically (e.g., according to a predetermined schedule, when specific conditions are met, etc.). In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way.

Figure 2B:
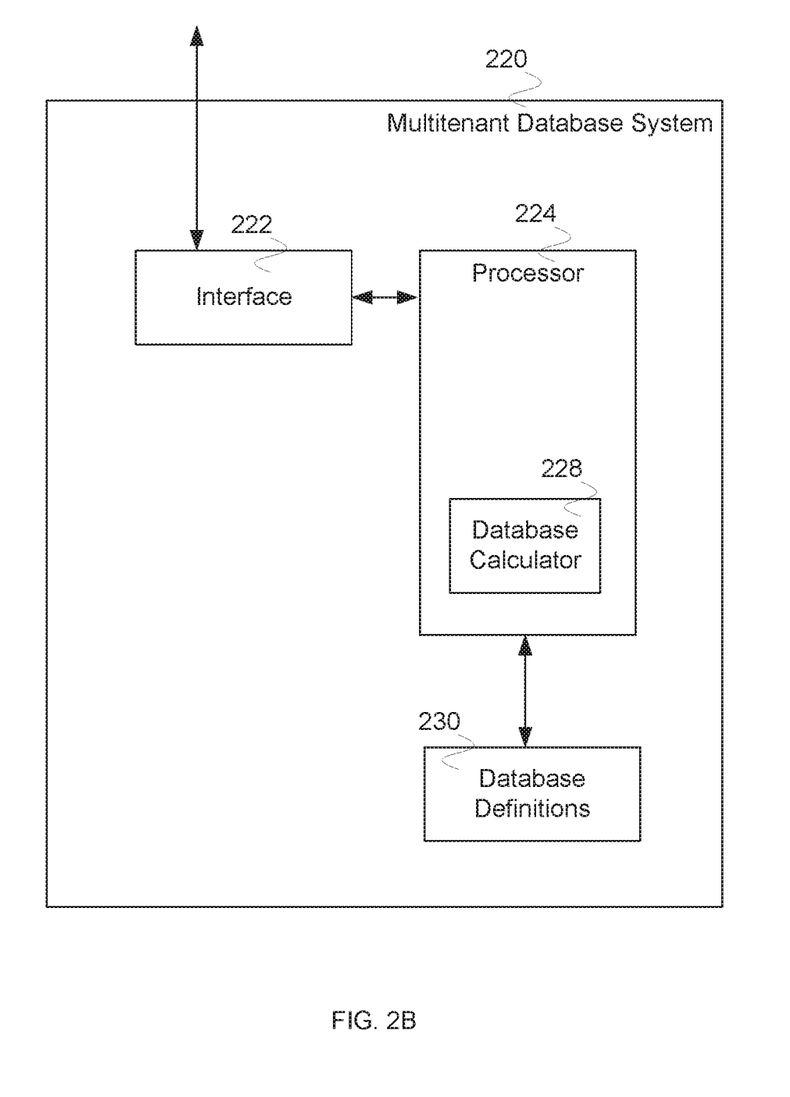
FIG. 2B is a block diagram illustrating an embodiment of a multitenant database system.

FIG. 2B is a block diagram illustrating an embodiment of a multitenant database system. In some embodiments, multitenant database system 220 is used to implement multitenant database system 106 of FIG. 1 with tenant data storage system of FIG. 2A. In the example shown, a multitenant database system 220 receives a request, via interface 222, from a user for a service that uses multitenanted data. Database calculator 228 of processor 224 using database definitions 230 determines a report using data stored in a comingling storage unit and provides the report to the user. The calculation associated with the service is performed using processor 224 or is outsourced to be performed by another processor (e.g., a processor associated with a multitenant database system). The data determined to be associated with the calculation is first evaluated for access rights associated both with the data and the requestor.

Figure 3:
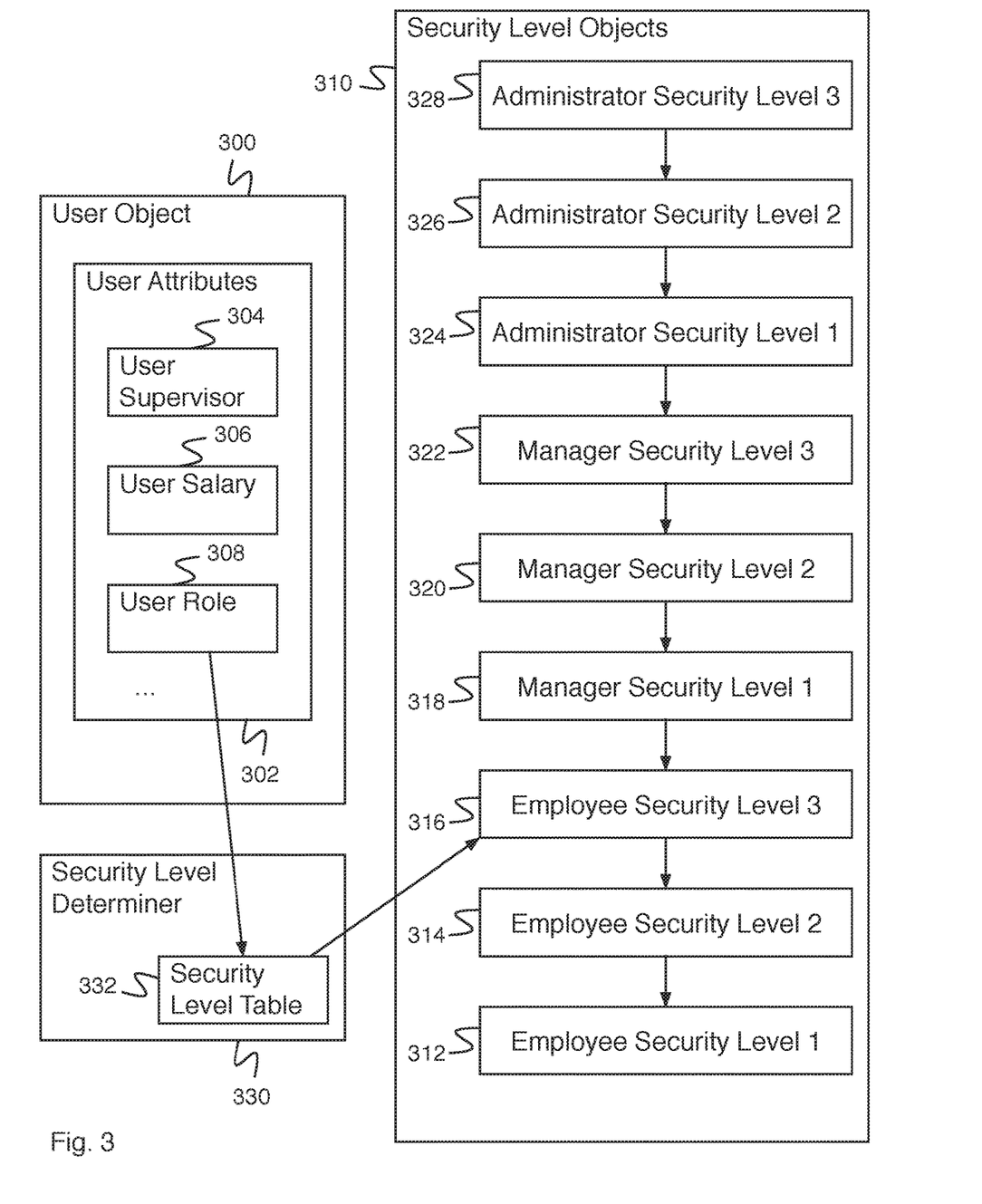
FIG. 3 is a block diagram illustrating an embodiment of user security.

FIG. 3 is a block diagram illustrating an embodiment of user security. User object 300 comprises a user object associated with a user (e.g., a user using a tenant system to access data on a tenant data storage system). In some embodiments, user object 300 is stored on a tenant data storage unit (e.g., tenant data storage unit 202 of FIG. 2A). User object 300 comprises user attributes 302. User attributes 302 comprise attributes describing the user associated with user object 300. User attributes 302 comprise user supervisor 304, user salary 306, user role 308, and any other appropriate user attributes. User supervisor 304 comprises a reference to another user object indicating the supervisor of the user. User salary 306 comprises a numeric value indicating the user salary. User role 308 comprises an indication of a user role (e.g., a name of a user role, a reference to a user role object, etc., indicating the role of the user in the organization). A security level determination is made based at least in part on user role 308. Security level determiner 330 receives an indication of user role 308 and uses security level table 332 to determine a security level object (e.g., security level object of security level objects 310) indicating the security level associated with the user. Security level objects 310 comprises a set of security level objects (e.g., employee security level 1 312, employee security level 2 314, employee security level 3 316, manager security level 1 318, manager security level 2 320, manager security level 3 322, administrator security level 1 324, administrator security level 2 326, and administrator security level 3 328). Each security object of the set of security objects has a superset of the access of the security object below it. In the example shown, security level table 332 indicates that the user security level associated with user object 300 is employee security level 3 316.

In some embodiments, security level table 332 comprises one of a set of security level tables, wherein each security level table is associated with a tenant. When security level determiner 330 receives a request to determine a security level associated with a user, it first determines the tenant associated with the user, determines the security level table associated with the tenant, and uses the determined security level table to determine the security level associated with the user. A set of security level tables is used in order to map disparate organizational structures or orderings of roles to a common set of security levels.

Figure 4:
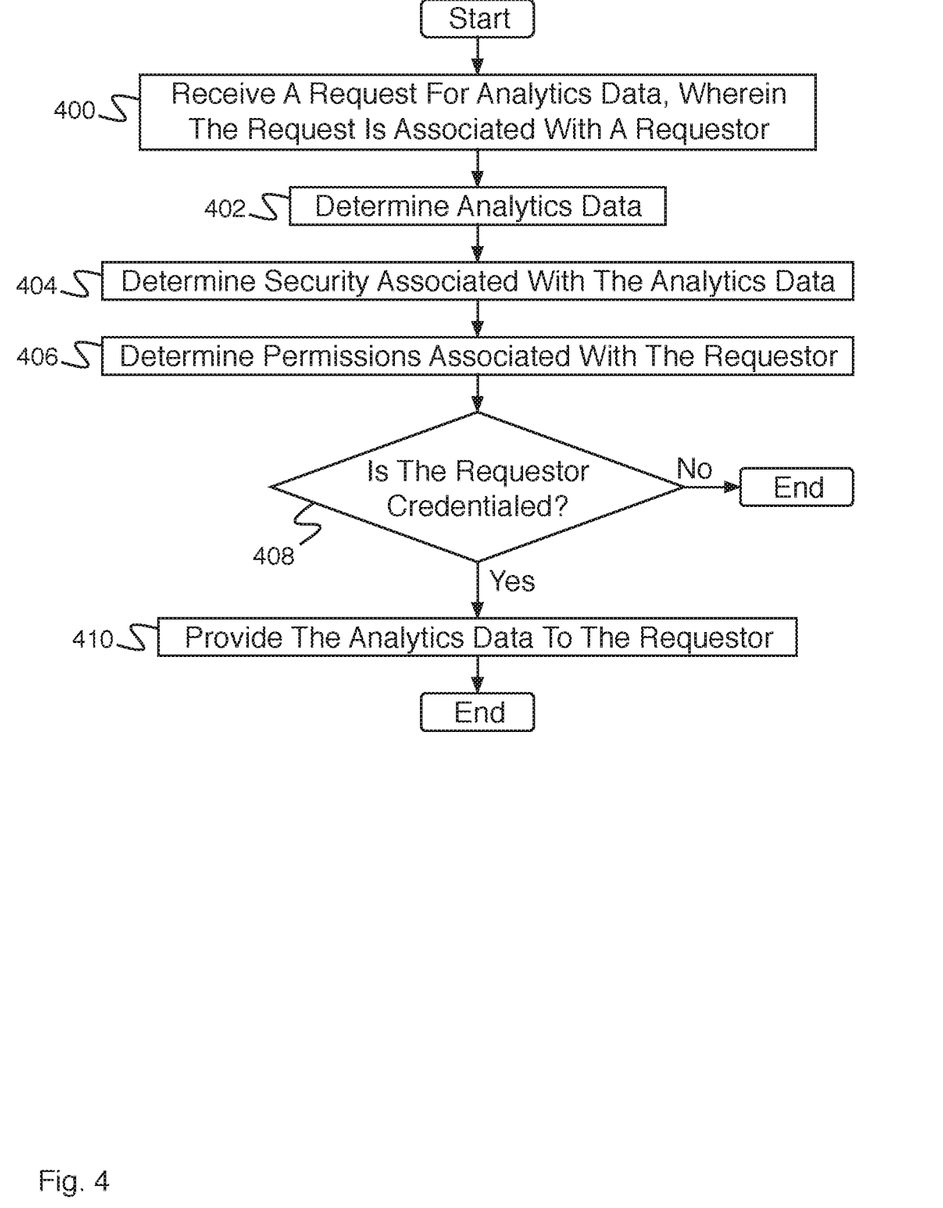
FIG. 4 is a flow diagram illustrating an embodiment of a process for analytics security.

FIG. 4 is a flow diagram illustrating an embodiment of a process for analytics security. In some embodiments, the process of FIG. 4 is executed by tenant data storage system 104 of FIG. 1. In the example shown, in 400, a request is received for analytics data, wherein the request is associated with a requestor. For example, a request is received for data associated with an analytic calculation requested for the determination of a service (e.g., a benchmark). In 402, analytics data is determined. For example, appropriate data is determined as appropriate in response to the request for the analytics calculation. In 404, security associated with the analytics data is determined. In 406, permissions associated with the requestor are determined. In 408, it is determined whether the requestor is credentialed. In the event it is determined that the requestor is not credentialed, the process ends. In the event it is determined that the requestor is credentialed, control passes to 410. In 410, analytics data is provided to the requestor. In some embodiments, the subset of data that is approved for access is provided for the analytics calculation.

In some embodiments, the steps of FIG. 4 are performed in a different order—for example, in some cases it is determined, when a requestor makes a request, whether the requestor is able to make that request (e.g., whether the request is related to an area that the client associated with the request has opted into).

Figure 5:
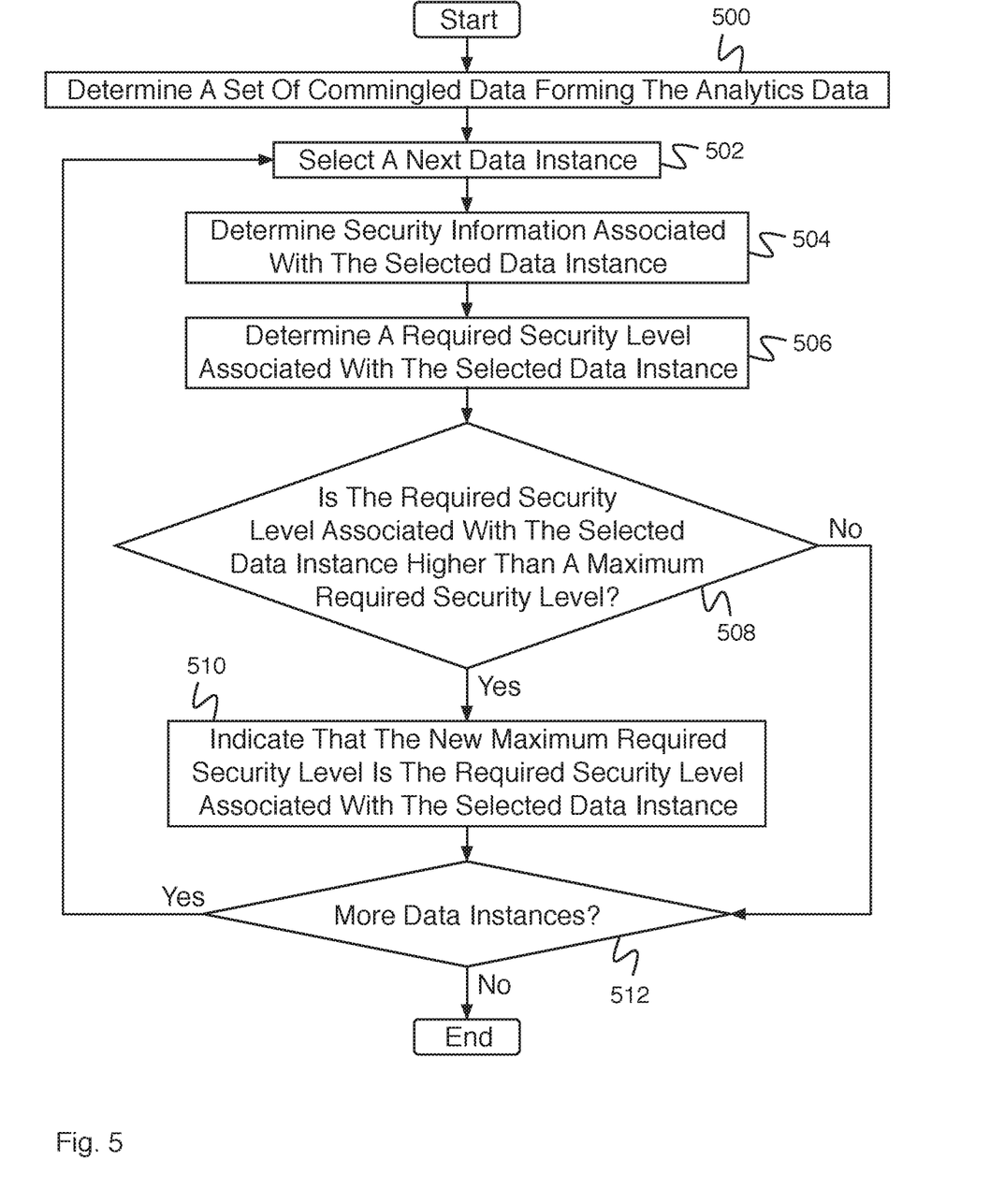
FIG. 5 is a flow diagram illustrating an embodiment of a process for determining security associated with analytics data.

FIG. 5 is a flow diagram illustrating an embodiment of a process for determining security associated with analytics data. In some embodiments, the process of FIG. 5 implements 404 of FIG. 4. In the example shown, in 500, a set of commingled data forming the analytics data is determined. The set of commingled data forming the analytics data comprises the set of commingled data from which the analytics data was determined. In 502, a next data instance is determined. In some embodiments, the next data instance comprises the first data instance. In 504, security information associated with the selected data instance is determined. Security information comprises information indicating the security level associated with the data instance. In 506, a required security level associated with the selected data instance is determined (e.g., from the security information). In 508, it is determined whether the required security level associated with the selected data instance (e.g., determined in 506) is higher than a maximum required security level (e.g., the maximum required security level that has already been determined by the process of FIG. 5). In the event it is determined that the required security level associated with the selected data instance is not higher than a maximum required security level, control passes to 512. In the event it is determined that the required security level associated with the selected data instance is higher than a maximum required security level, control passes to 510. In 510, the process indicates that the new maximum required security level is the required security level associated with the selected data instance. In 512, it is determined whether there are more data instances. In the event it is determined that there are more data instances, control passes to 502. In the event it is determined that there are not more data instances, the process ends.

Figure 6:
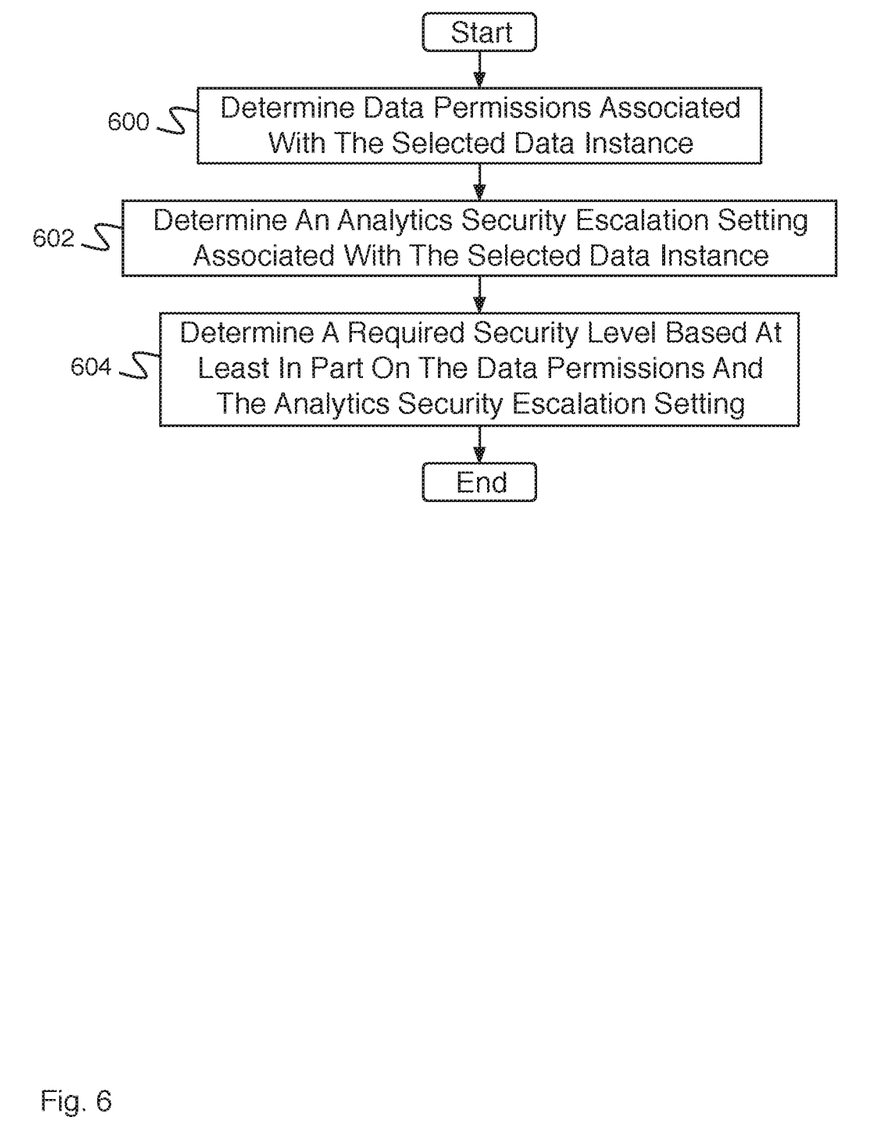
FIG. 6 is a flow diagram illustrating an embodiment of a process for determining a required security level associated with a selected data instance.

FIG. 6 is a flow diagram illustrating an embodiment of a process for determining a required security level associated with a selected data instance. In some embodiments, the process of FIG. 6 implements 506 of FIG. 5. In the example shown, in 600, data permissions associated with the selected data instance are determined. Data permissions associated with the selected data instance indicate a user security level required by the data owner to access the selected data instance. In 602, an analytics security escalation setting associated with the selected data instance is determined. An analytics security escalation setting comprises a number of security level steps (e.g., steps up or down, of an ordered set of security levels) the data permissions are modified by when included in analytics. In 604, a required security level is determined based at least in part on the data permissions and the analytics security escalation setting (e.g., by adjusting the data permissions according to the analytics security escalation setting).

In some embodiments, data permissions associated with the selected data instance determined in 600 indicate a user role required by the data owner to access the selected data instance. A security level required by the data owner to access the selected data instance is determined using a security level determiner including one or more security level tables for indicating a security level based at least in part on a role or a tenant.

Figure 7:
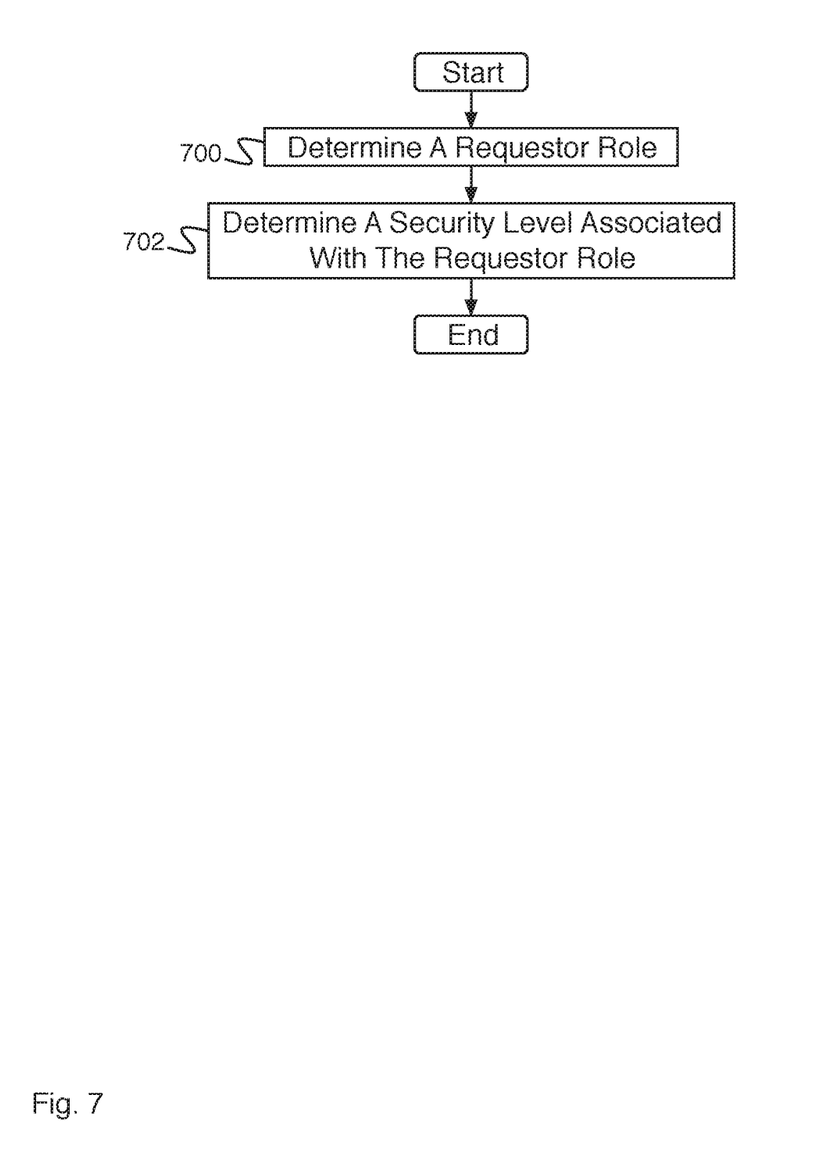
FIG. 7 is a flow diagram illustrating an embodiment of a process for determining permissions associated with a requestor.

FIG. 7 is a flow diagram illustrating an embodiment of a process for determining permissions associated with a requestor. In some embodiments, the process of FIG. 7 implements 406 of FIG. 4. In the example shown, in 700, a requestor role is determined. The requestor role comprises a requestor role indication associated with requestor information (e.g., a requestor object). In 702, a security level is determined associated with the requestor role (e.g., using a security level table). In some embodiments, determining the security level is based at least in part on the requestor tenant.

Figure 8:
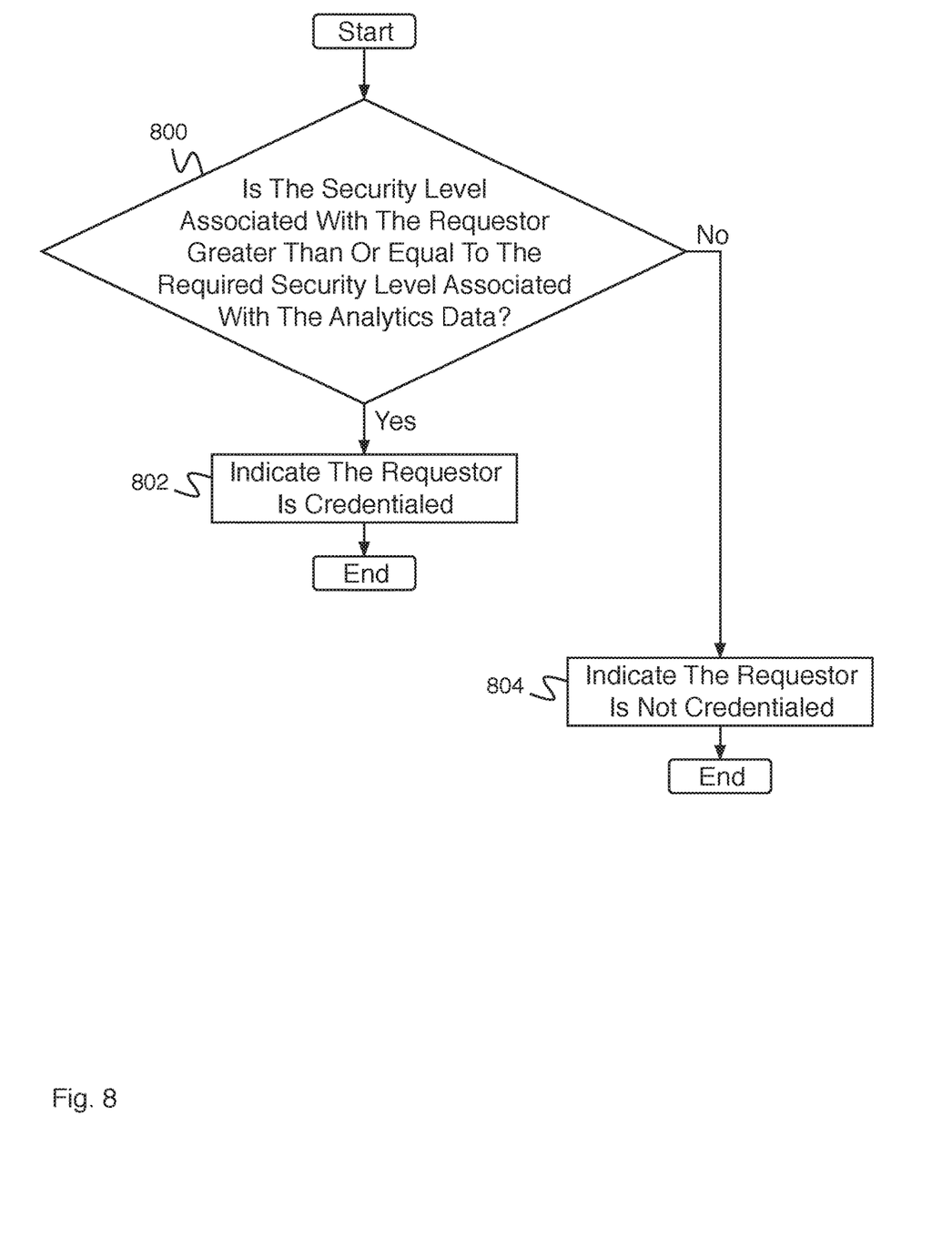
FIG. 8 is a flow diagram illustrating an embodiment of a process for determining whether a requestor is credentialed.

FIG. 8 is a flow diagram illustrating an embodiment of a process for determining whether a requestor is credentialed. In some embodiments, the process of FIG. 8 implements 408 of FIG. 4. In the example shown, in 800, it is determined whether the security level associated with the requestor (e.g., determined using the process of FIG. 7) is greater than or equal to the required security level associated with the analytics data (e.g., determined using the process of FIG. 5). In the event it is determined that the security level associated with the requestor is greater than or equal to the required security level associated with the analytics data, control passes to 802. In 802, the process indicates that the requestor is credentialed, and the process ends. In the event it is determined in 800 that the security level associated with the requestor is not greater than or equal to the required security level associated with the analytics data, control passes to 804. In 804, the process indicates that the requestor is not credentialed.

Figure 9:
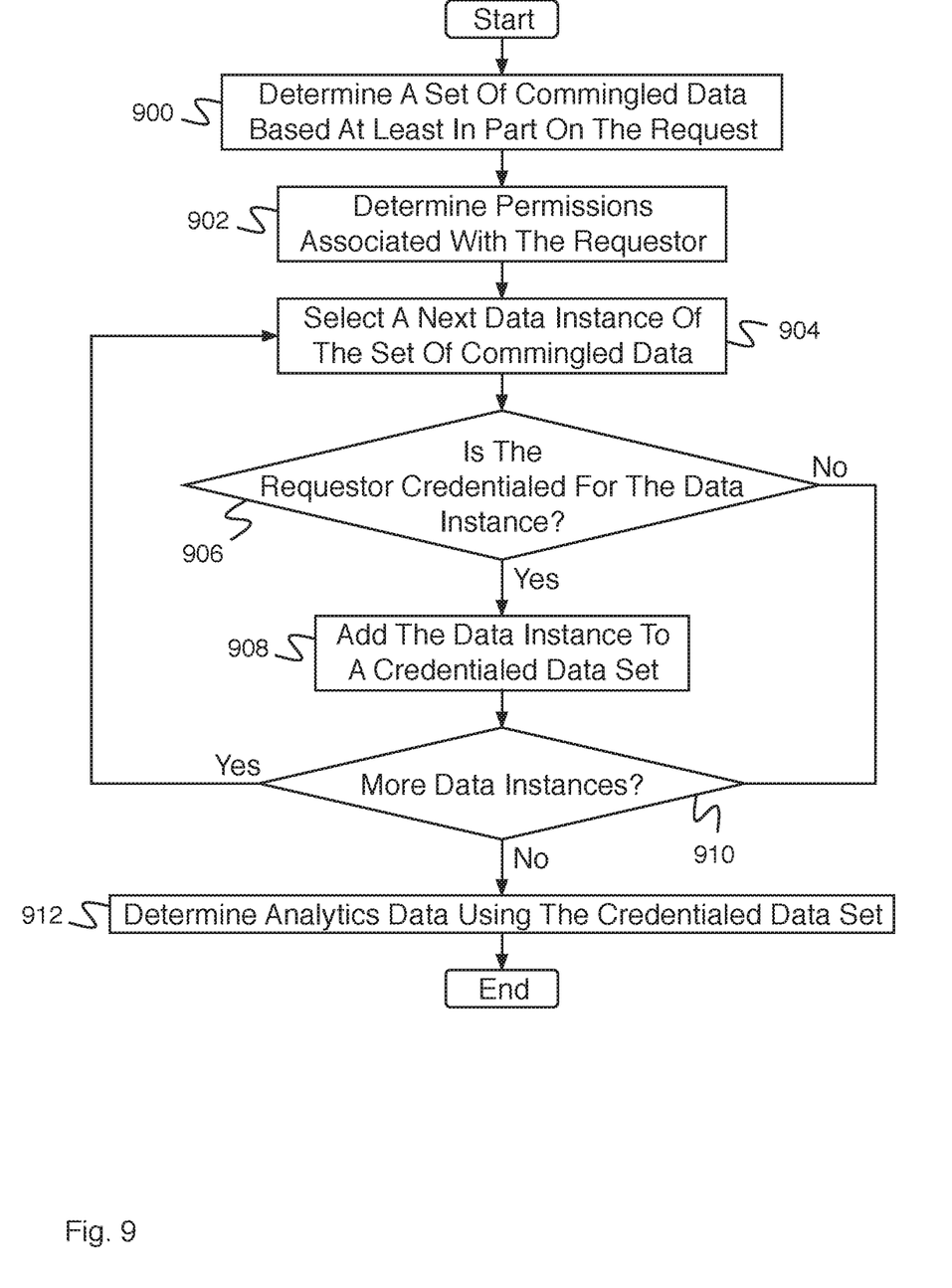
FIG. 9 is a flow diagram illustrating an embodiment of a process for determining analytics data.

FIG. 9 is a flow diagram illustrating an embodiment of a process for determining analytics data. In some embodiments, the process of FIG. 9 implements 402 of FIG. 4. The process of FIG. 9 comprises a process for determining analytics data such that the determined analytics data is accessible by the requesting user. In 900, a set of commingled data is determined based at least in part on the request. The set of commingled data comprises commingled data for determining analytics. In 902, permissions associated with the requestor are determined. In 904, a next data instance of the set of commingled data is selected. In some embodiments, the next data instance comprises the first data instance. In 906, it is determined whether the requestor is credentialed for the data instance (e.g., whether the requestor is allowed to access the data instance, according to the permissions associated with the requestor and the security associated with the data instance). In the event it is determined that the requestor is not credentialed for the data instance, control passes to 910. In the event it is determined that the requestor is credentialed for the data instance, control passes to 908. In 908, the data instance is added to a credentialed data set. In 910, it is determined whether there are more data instances (e.g., of the set of commingled data). In the event it is determined that there are more data instances, control passes to 904. In the event it is determined that there are not more data instances, control passes to 912. In 912, analytics data is determined using the credentialed data set.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for analytics security, comprising:
one or more processors; and
a non-transitory computer readable medium including one or more instructions that, when executed by the one or more processors, cause the system to perform operations comprising:
receiving a request for analytics data, wherein the request is associated with a requestor; and
determining the analytics data based at least in part on the request, comprising determining commingled data used for determining the analytics data, wherein the analytics data comprises one or more results of an analytic calculation performed on commingled data, wherein the commingled data comprises tenant data shared by a tenant of a plurality of tenants and other tenant data shared by one or more other tenants of the plurality of tenants;
determining security information associated with the analytics data, wherein the security information associated with the analytics data is based at least in part on the commingled data;
determining permissions associated with the requestor based at least in part on the tenant of the plurality of tenants, wherein the tenant of the plurality of tenants is associated with the requestor;
determining whether the requestor is credentialed based at least in part on the security information associated with the analytics data and the permissions associated with the requestor; and
providing the analytics data to the requestor based on a determination that the requestor is credentialed.

2. The system of claim 1, wherein the commingled data has associated security information.

3. The system of claim 2, wherein the associated security information comprises a source data security level.

4. The system of claim 2, wherein the associated security information comprises an analytics security escalation setting.

5. The system of claim 4, wherein the analytics security escalation setting comprises a number of steps of a security hierarchy that make up a set of security levels.

6. The system of claim 1, wherein determining the security information associated with the analytics data comprises determining a required security level associated with the comingled data.

7. The system of claim 1, wherein determining the security information associated with the analytics data comprises determining a maximum required security level associated with a group of comingled data.

8. The system of claim 1, wherein the permissions associated with the requestor are based at least in part on a requestor role.

9. The system of claim 1, wherein determining the permissions associated with the requestor comprises determining a security level associated with the requestor.

10. The system of claim 1, wherein determining security associated with the analytics data comprises determining a maximum security level associated with the analytics data.

11. The system of claim 10, wherein the maximum security level associated with the analytics data is based at least in part on a required role associated with a data instance of the analytics data.

12. The system of claim 10, wherein the maximum security level associated with the analytics data is based at least in part on a tenant associated with a data instance of the analytics data.

13. The system of claim 1, wherein determining whether the requestor is credentialed comprises determining whether a security level associated with the requestor is greater than or equal to a maximum security level associated with the analytics data.

14. The system of claim 1, wherein the analytics data is determined such that it is accessible by the requestor.

15. The system of claim 1, wherein a maximum security level associated with the analytics data is reset from a required security level of another data instance of the commingled data.

16. The system of claim 1, wherein the processor is additionally configured to determine that the tenant is enabled to access the analytics data, comprising determining that the tenant opts in to sharing the tenant data to the commingled data.

17. A method comprising:
receiving a request for analytics data, wherein the request is associated with a requestor; and
determining, using a processor, the analytics data based at least in part on the request, comprising determining commingled data used for determining the analytics data, wherein the analytics data comprises one or more results of an analytic calculation performed on commingled data, wherein the commingled data comprises tenant data shared by a tenant of a plurality of tenants and other tenant data shared by one or more other tenants of the plurality of tenants;
determining security information associated with the analytics data, wherein security information associated with the analytics data is based at least in part on the commingled data;
determining permissions associated with the requestor based at least in part on the tenant of the plurality of tenants, wherein the tenant of the plurality of tenants is associated with the requestor;
determining whether the requestor is credentialed based at least in part on the security information associated with the analytics data and the permissions associated with the requestor, wherein the security information associated with the analytics data is based at least in part on the commingled data used for determining the analytics data; and
providing the analytics data to the requestor based on a determination that the requestor is credentialed.

18. A computer program product for analytics security, the computer program product being embodied in a non-transitory computer readable storage medium and comprising computer instructions for:
receiving a request for analytics data, wherein the request is associated with a requestor; and
determining the analytics data based at least in part on the request, comprising determining commingled data used for determining the analytics data, wherein the analytics data comprises one or more results of an analytic calculation performed on commingled data, wherein the commingled data comprises tenant data shared by a tenant of a plurality of tenants and other tenant data shared by one or more other tenants of the plurality of tenants;
determining security information associated with the analytics data, wherein security information associated with the analytics data is based at least in part on the commingled data used for determining the analytics data;
determining permissions associated with the requestor based at least in part on the tenant of the plurality of tenants, wherein the tenant of the plurality of tenants is associated with the requestor;
determining whether the requestor is credentialed based at least in part on the security information associated with the analytics data and the permissions associated with the requestor, wherein the security information associated with the analytics data is based at least in part on the commingled data; and
providing the analytics data to the requestor based on a determination that the requestor is credentialed.

* * * * *